United States Patent [19]

Sanders

[11] Patent Number: 4,600,665
[45] Date of Patent: Jul. 15, 1986

[54] STORAGE BATTERY HEAT MAINTENANCE APPARATUS

[75] Inventor: Ronald J. Sanders, Anoka, Minn.

[73] Assignee: Weather Ready Inc., Fridley, Minn.

[21] Appl. No.: 728,792

[22] Filed: Apr. 30, 1985

Related U.S. Application Data

[63] Continuation-in-part of Ser. No. 642,580, Aug. 20, 1984, abandoned.

[51] Int. Cl.$^4$ .............................................. H01M 10/50
[52] U.S. Cl. .................................. 429/120; 339/112 L
[58] Field of Search ...................... 429/120; 339/112 L

[56] References Cited

U.S. PATENT DOCUMENTS

| | | | |
|---|---|---|---|
| 2,399,942 | 5/1946 | Resek | 123/142.5 |
| 2,855,453 | 10/1958 | Eidensohn | 429/120 |
| 3,110,633 | 11/1963 | Bachmann | 429/120 |
| 4,126,734 | 11/1978 | Walters | 429/71 |

FOREIGN PATENT DOCUMENTS 0776240 6/1957 United Kingdom ................ 429/120

Primary Examiner—Donald L. Walton
Attorney, Agent, or Firm—Alan D. Kamrath; George A. Leone, Sr.

[57] ABSTRACT

Disclosed herein is a storage battery heat maintenance unit which in the preferred embodiment comprises an adaptor post, U-tube heating coil and cap which mount over at least one terminal post of a standard electric storage battery of the type generally used in automotive vehicles. The U-tube heating coil is connected to the liquid cooling system of the vehicle's engine thereby circulating coolant about the terminal post. Heat is thereby conducted through the U-tube heating coil, the adaptor post and through the terminal post into the storage battery. In this way the internal temperature of the storage battery is raised to high efficiency operating temperatures under cold weather conditions.

22 Claims, 5 Drawing Figures

U.S. Patent　　Jul. 15, 1986　　4,600,665
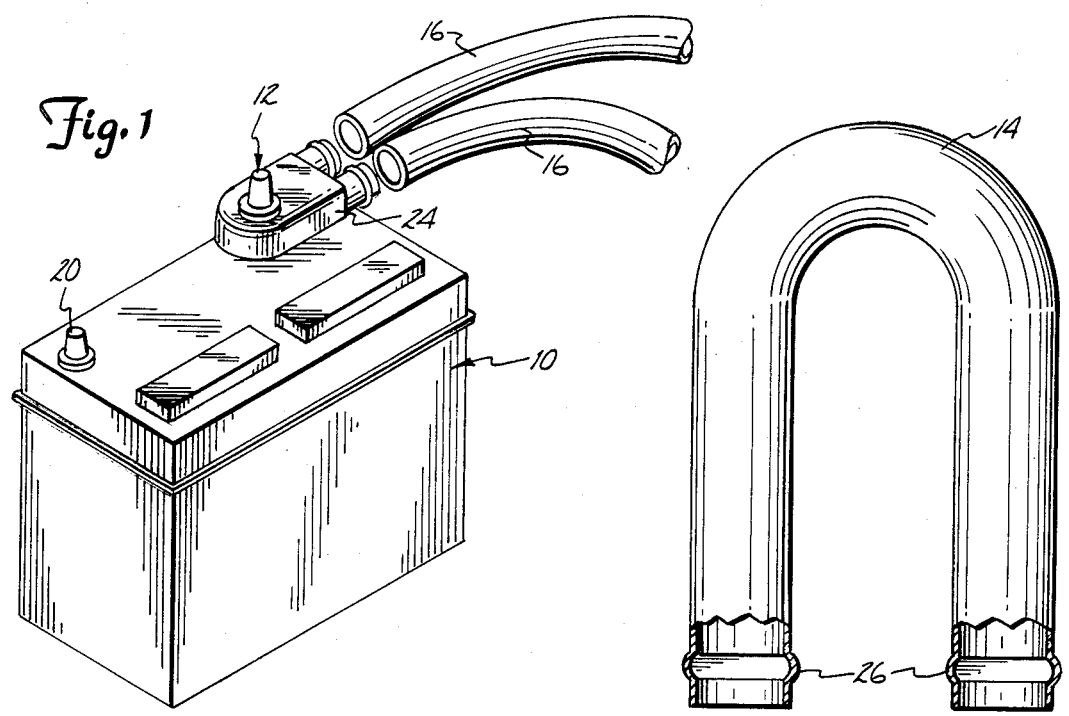
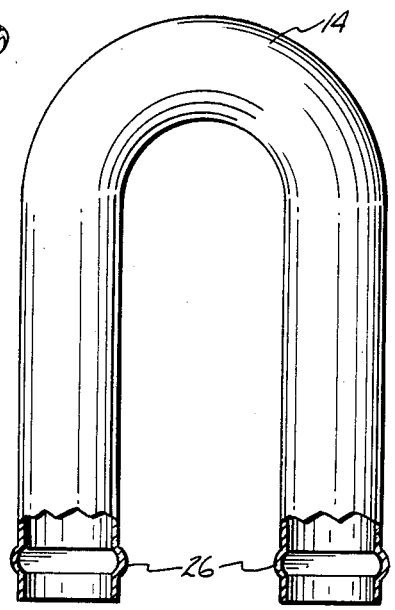
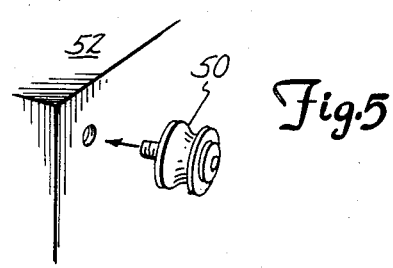
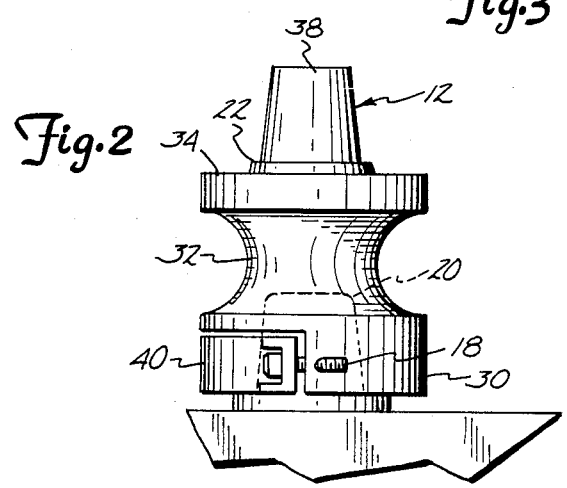
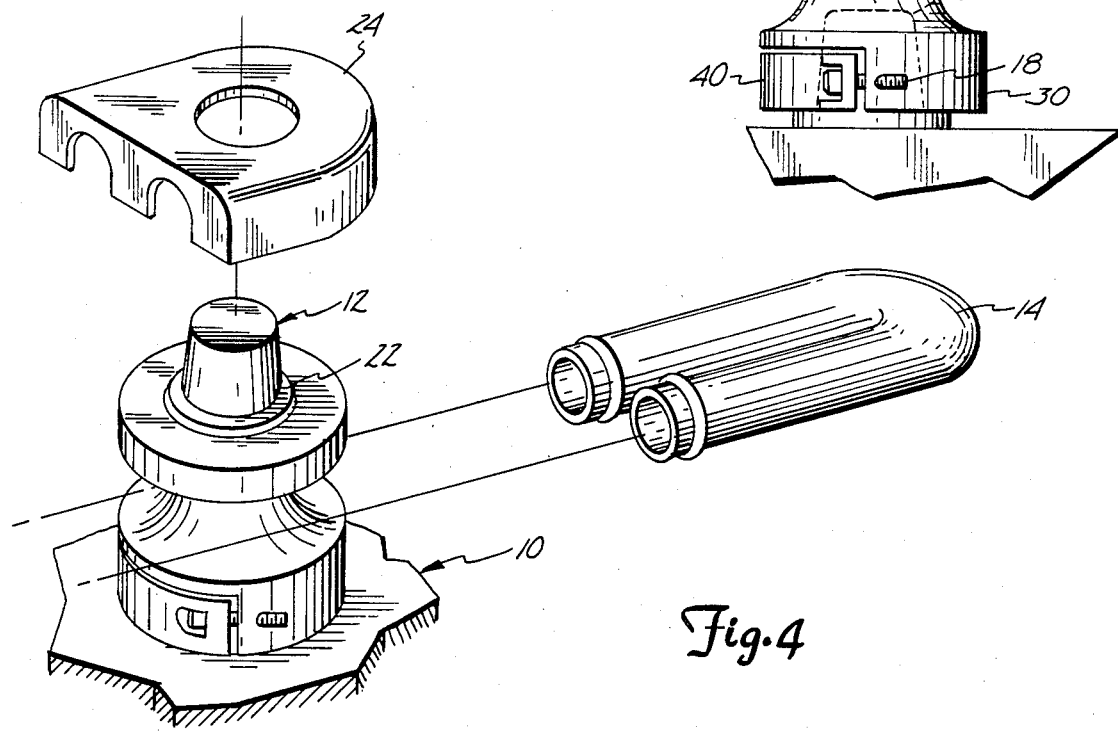

STORAGE BATTERY HEAT MAINTENANCE APPARATUS

This application is a continuation-in-part of my co-pending application, Ser. No. 642,580 filed Aug. 20, 1984, now abandoned, and relates to a heating and heat maintenance system for storage batteries utilized in automotive vehicles, and, in particular, to an improved apparatus for maintaining temperatures in such storage batteries in high efficiency operating ranges regardless of extremely low ambient air temperatures. The existing liquid cooling system of the automotive vehicle is modified and adapted to conform with the present invention for the purpose of transferring heat to the vehicle's storage battery through one or more of the storage battery's terminal posts.

BACKGROUND OF THE INVENTION

As is well known in the automotive art, internal combustion engines, particularly diesels, are extremely hard to start in colder climates, such as the Northern United States, during the winter months. This is due primarily to a combination of three factors precipitated by the cold weather. They are, the extreme thickening of engine lubricants, the lessened volatility of fuel mixtures, and the reduced cranking power of engine-starter storage batteries. It is well documented in the storage-battery art that the reserve capacity, or cranking power of lead-acid storage batteries is reduced substantially by lower temperatures. This drop is roughly 0.064% per degree Fahrenheit in the range of about 90° F. to about −30° F.

There have been many attempts to solve cold weather starting problems by engine "add-on" devices. The most common example of such an "add-on" device is the type of electric heater which heats various parts of the engine, oil, and fuel. Such electric heater units must be plugged into outlets continuously to be effective. Some electric warmers are also available for batteries. All of these plug-in heaters convert high grade energy into low grade heat and they cannot function if external electrical power is not available.

Other types of temperature-sustaining apparatus known in the storage-battery art require complex siphoning systems as taught by U.S. Pat. No. 2,399,942 to M. Resek, or relatively expensive systems having insulated containers, thermal regulation valves and related components as taught by U.S. Pat. No. 3,110,633 to W. D. Bachmann. Such systems have the further drawback of being extremely difficult to retrofit onto a vehicle having a standard factory-installed cooling system.

The present invention avoids the problems and complexities inherent in the aforedescribed prior art, and provides a novel and improved electric storage battery apparatus which maintains high efficiency and is easily adapted or retrofitted to vehicles having a system for circulating liquid coolant. Further, the present invention is compatible with existing devices, such as conventional tank heating equipment. It is also recognized that the present invention increases battery charging efficiency and, therefore, use of the present invention may result in the additional benefit of increased gas mileage.

SUMMARY OF THE INVENTION

The present invention provides a temperature-maintaining apparatus designed to maintain the internal temperature of electric storage batteries of generally conventional construction in high efficiency operating ranges even under extremely cold ambient air conditions. Accordingly, the present invention relates to apparatus which includes an electric storage battery including plates and electrolyte within a casing and having at least one terminal post whereon heat is applied to said electric storage battery. The invention may include a coiled heating element fastened to the terminal post, preferably by means of an elongated adapter post terminal suitably shaped and capped to accept the coiled heating element. The adaptor post is preferably mounted on the negative battery terminal post. Liquid coolant from the vehicle's engine cooling system is made to flow through the coiled heating element which maintains a relatively good thermal conductivity path with the terminal post through surface contact. The circulation of liquid coolant through the coiled heating element thereby transfers heat to the terminal post, which, in turn, transfers heat to the storage battery. Since a standard storage battery has a large heat capacity, the battery will maintain high efficiency operating temperatures as for a significant amount of time after the engine is shut off. Further, if the present invention is retrofitted onto an existing electric storage battery unit, it is preferable that a locking mechanism be fashioned onto the base of the elongated adaptor post suitable for locking the elongated adapter post onto the battery terminal post. The elongated adaptor post also provides means for connecting standard battery cables to the storage battery. Further, it is preferable that the coiled heating element be in the form of a U-tube having a beaded inlet and outlet wherein such beads will tend to prevent hoses carrying the liquid coolant from breaking free or leaking at the point of connection with the coiled heating element.

Although the features of this invention which are believed to be novel are set forth in the appended claims, details as to its organization and method of operation, together with the further objects and advantages thereof, may be best understood through reference to the following description taken in connection with the accompanying drawings, wherein:

BRIEF DESCRIPTION OF DRAWINGS

FIG. 1 is an elevated view of an improved storage battery heat maintenance apparatus;

FIG. 2 is a side view of an elongated battery post adaptor showing the adaptor post of this invention fastened over the electric storage battery terminal post as shown by the dashed-line outline;

FIG. 3 provides a partly cut away top view of a heating coil having the shape of a U-tube with beaded ends;

FIG. 4 is an exploded view showing the method of assembly of the cap and U-tube type heating coil components of a storage battery heating unit; and FIG. 5 is an elevated view of an alternate embodiment of the present invention's adaptor post for use with side-post storage batteries.

DESCRIPTION OF THE PREFERRED EMBODIMENTS

Referring first to FIG. 1, a common storage battery 10 of the standard type used in automotive vehicles is shown. The storage battery 10 has two terminal posts 20. Attached to one of the terminal posts 20 are a U-tube heating coil 14, a cap 24 and an adaptor post 12. Liquid coolant is circulated through the U-tube 14 by means of attachment to liquid cooling hoses 16 which, in turn, are connected to the vehicle's liquid coolant system (not shown).

Referring now to FIG. 3, this is a detailed top view of the U-tube heating coil 14 having circumferential beads 26 at or near the ends of the U-tube 14. The beads 26 provide a means to prevent leakage of liquid coolant and slippage of the liquid coolant hoses 16. While the U-tube 14 may be fashioned from any material capable of suitably conducting heat through surface contact with the terminal post 12, it is preferred that the U-tube 14 be manufactured from copper, brass or a similar metal. The beads 26 may preferably be embossed onto the U-tube 14 utilizing well-known techniques.

Referring now to FIG. 2, is a detailed view showing an adaptor post 12 which is fastened to the terminal post 20 as shown by the dashed-line outline. The adaptor post is conveniently made of metal which permits relatively good thermal conductivity, preferably brass. The adaptor post 12 has an opening in the bottom which is located axially in the adaptor post 12 and is of a suitable size to allow insertion of the terminal post 20 resulting in a frictional recessed fit of the terminal post 20 into the adaptor post 12. Because the negative terminal post is usually grounded to the engine, it is preferrable to use the negative terminal post for the terminal post 20.

As is shown in the FIG. 2 embodiment of the adaptor post 12, the adaptor post 12 is generally in the shape of an elongated cylinder having a base 30, a circumferential groove 32 of suitable shape to slidingly mate with the U-tube heating coil 14, an upper rim 34 defined by locating the circumferential groove 32 between the upper rim 34 and the base 30. Further, in this embodiment, a tapered post 38 generally of the same size and shape as the terminal post 20, and suitable for mating with standard automotive battery cable connectors, is attached as an integral piece of the terminal post 20 axially located in line with the axis of the adaptor post 12. The tapered post 38 is generally cylindrical and flares outwardly from the top of said tapered post 38 to the upper rim 34 of the adaptor post 12. Further, the tapered post 38 may conveniently have a shoulder 22 of larger diameter than the tapered post 38, but smaller than the diameter of the upper rim 34.

Still referring to the FIG. 2 embodiment of the adaptor post 12, said post 12 may be conveniently fastened to the battery terminal post 20 by means of a locking mechanism defined by a saw-cut into the base 30 perpendicular to the surface of said base 30 and penetrating to about the center of the base 30, and a second saw-cut perpendicular to the first saw cut and joining the first saw cut on one side of the base 30 such that the two cuts form an L-shaped, spring-like tab 40 on one side of the base 30. The tab 40 is conveniently tapped through the second saw cut and through the base to allow the introduction of a fastener. In the embodiment of this example, the fastener may conveniently be a locking screw 18. As the locking screw 18 is tightened, the adaptor post 12 is secured to the terminal post 20.

Referring now to FIG. 4, an exploded view of a cap 24, the adaptor post 12 and the U-tube 14 shows the relative positions of these elements of this embodiment of the invention with respect to the storage battery 10 which is shown in a cut-away view. The cap 24 is generally U-shaped having a hole of sufficient size to frictionally fit over the shoulder 22 and being of a sufficient size within which to recess the U-tube 14 after the U-tube is slidingly connected to the adaptor post 12. The cap 24 conveniently has two generally semi-circular holes located at one end in a plane parallel to the axis of the adaptor post 12 and positioned to mate with the U-tube 14 by snapping on over the ends of U-tube 14 leaving the beads 26 exposed. In one embodiment of this invention, the cap 24 is preferably made of glass filled black polypropylene.

Referring again to FIG. 1, the embodiment shown heats the storage battery 10 when liquid coolant is circulated by means of the hoses 16 through the U-tube heating coil 14 which maintains surface contact with the adaptor post 12. Heat is transferred from the liquid coolant to the surface of the U-tube heating coil 14 and then to the adaptor post 12. As the adaptor post 12 is heated, heat is further conducted to the terminal post 20. From the terminal post 20 the heat is conducted, through internal connections, into the storage battery 20, raising the internal storage battery temperature to higher efficiency ranges.

Referring now to FIG. 5, an alternate embodiment of the present invention's adaptor post is shown as side adaptor post 50 having an axial threaded bolt on one end for use with a side-post storage battery 52. The side adaptor post 50 replaces the storage battery's 52 terminal bolt by threading into the hole provided for the terminal bolt. A standard sidepost battery cable is terminated with an eyelet. The side-post adaptor 50 is inserted through the cable eyelet and into the threaded terminal bolt hole thereby fastening the battery cable to the battery 50. The heating coil 14 and cap 24 are attached to the side-post adaptor 50 as described hereinabove for the configuration of the present invention utilizing an adaptor post 12.

Since, as is well known in the art, a standard storage battery has a large heat capacity, if the present invention is used in connection with a standard storage battery, the battery will lose heat very gradually after the engine is shut off, thereby maintaining its internal temperature in a higher operating efficiency range than the temperature in the surrounding air. The invention may also be used in connection with storage battery insulation units known in the art to further enhance the heat maintaining capability of the storage battery and for longer time periods. However, precautions should be taken to prevent the internal battery temperature from exceeding 90° F.

It should be understood that the specific embodiments of the invention herein disclosed are of a descriptive rather than a limiting nature, and that various changes, combinations, substitutions or modifications may be employed in accordance with these teachings without departing either in spirit or scope from this invention in its broader aspects.

What is claimed is:

1. Heat maintenance apparatus for storage battery having at least one terminal for removable interconnection with a battery cable comprising, in combination: an elongated adapter post having a generally cylinder-shaped outer surface; a circumferential groove formed in the outer surface of the adapter post defining a base and an upper rim on the elongated adapter post; an axially extending shoulder formed on the upper rim of the adapter post having a diameter smaller than that of the upper rim; means formed on the base of the adapter post for removably connecting the elongated adapter post to the terminal of the storage battery; means formed on the shoulder of the upper rim of the adapter post for removably connecting the battery cable to the elongated adapter post; means in surface contact with the outer surface of the elongated adapter post for applying heat to the adapter post, with the heat applying means being generally U-shaped and having a shape complementary to and for slideable receipt in the circumferential groove of the outer surface and intermediate the base and the upper rim of the elongated, cylinder-shaped, adapter post; a cap for receipt on the upper rim of the elongated adapter post; an aperture formed in the cap complementary to and for frictional receipt on the shoulder of the adapter post, with the cap having a size and shape complementary to recess the heat applying means after the heat applying means is slideably connected to the adapter post to prevent the heat applying means from sliding on the circumferential groove and with the battery cable preventing removal of the aperture of the cap from the shoulder of the adapter post, with the elongated adapter post being formed of a material having good thermal conductivity to provide a relatively good thermal conductivity path between the heat applying means and the thermal of the storage battery to elevate the temperature of the terminal of the storage battery above ambient air temperature.

2. The storage battery heat maintenance apparatus of claim 1 wherein the cap is formed of glass filled polypropylene.

3. The storage battery heat maintenance apparatus of claim 1 wherein the terminal of the storage battery is a post; wherein the adapter post securing means comprises a hole axially located in the base of the adapter post of suitable size and shape to frictionally mate with and recess said terminal post of the storage battery and for fastening to said terminal by a first fastening means; and wherein said means for removably connecting the battery cable to the adapter post comprises a post axially located on the upper rim of said elongated adapter post and having about the same size and shape as said terminal post of the storage battery and flaring outwardly downward to said upper rim.

4. The storage battery heat maintenance apparatus of claim 3 wherein said first fastening means comprises a tab defined by an L-shaped saw cut into the base of said elongated adapter post, said tab and base having a threaded hole suitable for mating with a locking screw.

5. The storage battery heat maintenance apparatus of claim 1 wherein the adapter post secruing means comprises a threaded bolt protruding axially downward from said base of the elongated adapter post whereby said adapter post mates with said storage battery; and wherein said means for removably connecting the battery cable to the adapter post includes a threaded hole axially located on the upper rim of said elongated adapter post.

6. Heat maintenance apparatus for a storage battery having at least one terminal for removable interconnection with a battery cable comprising, in combination: an elongated adapter post having an outer surface; means for removably connecting the elongated adapter post to the terminal of the storage battery; means for removably electrically connecting the battery cable to the elongated adapter post; means for applying heat to the adapter post; and means for removably interconnecting the heat applying means in direct surface contact with the outer surface of the elongated adapter post, with the elongated adapter post being formed of a material having good thermal conductivity to provide a relatively good thermal conductivity path between the heat applying means and the terminal of the storage battery to elevate the temperature of the terminal of the storage battery above ambient air temperature.

7. The storage battery heat maintenance apparatus of claim 6 wherein the elongated adapter post is generally in the shape of an elongated cylinder; wherein the heat applying means is generally U-shaped; wherein the removably interconnecting means comprises means formed on the outer surface of the elongated, cylinder-shaped, adapter post complementary to and for slideably receiving the heat applying means; and means for fastening the heat applying means to the adapter post.

8. The storage battery heat maintenance apparatus of claim 7 wherein the slideably receiving means comprises a circumferential groove defining a base and an upper rim on the elongated adapter post, with the heat applying means being slideably connected on the circumferential groove and intermediate the base and the upper rim; and wherein the fastening means comprises, in combination: means for preventing slideable movement of the heat applying means in the circumferential groove of the elongated adapter post.

9. The storage battery heat maintenance apparatus of claim 8 wherein the slideable movement preventing means comprises, in combination: a cap for receipt on the upper rim of the elongated adapter post and having a size and shape complementary to recess the heat applying means after the heat applying means is slideably connected to the adapter post to prevent the heat applying means from sliding on the circumferential groove; and means for holding the cap on the upper rim of the elongated adapter post.

10. The storage battery heat maintenance apparatus of claim 9 wherein the cap holding means comprises, in combination: a shoulder formed on the upper rim of the adapter post having a diameter smaller than that of the upper rim; and an aperture formed in the cap complementary to and for frictional receipt on the shoulder of the adapter post, with the battery cable connecting means located in the shoulder of the adapter post allowing the battery cable to prevent removal of the aperture of the cap from the shoulder of the adapter post.

11. The storage battery heat maintenance apparatus of claim 10 wherein the cap is formed of glass filled polypropylene.

12. The storage battery heat maintenance apparatus of claim 10 wherein the terminal of the storage battery is a post; wherein the adapter post securing means comprises a hole axially located in the base of the adapter post of suitable size and shape to frictionally mate with and recess said terminal of the storage battery and for fastening to said terminal by a first fastening means; and wherein said means for removably connecting the battery cable to the adapter post comprises a post axially located on the upper rim of said elongated adapter post and having about the same size and shape as said terminal post of the storage battery and flaring outwardly downwardly to said upper rim.

13. The sotrage battery heat maintenance apparatus of claim 12 wherein said first fastening means comprises a tab defined by an L-shaped saw cut into the base of said elongated adapter post, said tab and base having a threaded hole suitable formating with a locking screw.

14. The storage battery heat maintenance apparatus of claim 10 wherein the adapter post securing means comprises a threaded bolt protruding axially downward from said base of the elongated adapter post whereby said adapter post mates with said storage battery.

15. The storage battery heat maintenance apparatus of claim 14 wherein said means for removably connecting the battery cable to the adapter post includes a threaded hole axially located on the upper rim of said elongated adapter post.

16. The storage battery heat maintenance apparatus of claim 10 wherein the heat applying means comprises a conduit for circularing a liquid coolant therethrough and in surface contact with the outer surface of the adapter post.

17. The storage battery heat maintenance apparatus of claim 16 further comprising, in combination: means for connecting the conduit to a liquid cooling system of an automotive type vehicle.

18. The storage battery heat maintenance apparatus of claim 6 wherein the removably interconnecting means comprises a base and an upper rim formed on the elongated adapter post, with the heat applying means being slideably connected on the adapter post intermediate the base and the upper rim, with the base and the upper rim preventing movement of the heat applying means therebeyond; and a cap for receipt on the upper rim of the elongated adapter post and having a size and shape complementary to recess the heat applying means after the heat applying means is slideably connected to the adapter post to prevent the heat applying means from sliding on the adapter post.

19. The storage battery heat maintenance apparatus of claim 6 wherein the heat applying means has a shape and size; wherein the removably interconnecting means comprises, in combination: a groove formed on the outer surface of the elongated adapter post having a shape and size generally equal to but slightly larger than the shape and size of the heat applying means for slideable receipt of the heat applying means, with the groove defining a base and a rim, with the base preventing movement of the heat applying means in a direction perpendicular to the groove and away from the rim, with the rim preventing movement of the heat applying means in a direction perpendicular to the groove and away from the base; and means removably secured to the adapter post for holding the heat applying means in the groove of the adapter post, with the complementary shapes and sizes of the heat applying means and the groove of the adapter body maximizing surface contact of the heat applying means with the adapter post for increasing thermal conductivity therebetween.

20. The storage battery heat maintenance apparatus of claim 19 wherein the heat applying means holding means comprises, in combination: a cap removably received on the upper rim of the elongated adapter post and having a size and shape complementary to recess the heat applying means after the heat applying means is slideably received in the groove of the adapter post to prevent the heat applying means from falling out of the groove of the elongated adapter post.

21. The storage battery heat maintenance apparatus of claim 6 wherein the removably interconnecting means comprises, in combination: means formed on the elongated adapter post for slideably receiving the heat applying means on the outer surface of the elongated adapter post for movement in a direction perpendicular to the axis of the elongated adapter post and for preventing movement of the heat applying means in a direction parallel to the axis of the elongated adapter post; and means removably secured to the adapter post for preventing slideable movement of the heat applying means in the direction perpendicular to the axis of the elongated adapter post.

22. Heat maintenance apparatus for a storage battery having at least one terminal for removable interconnection with a battery cable comprising, in combination: an elongated adapter post having an outer surface, with the elongated adapter post being formed of thermally conductive material; means for removably connecting the elongated adapter post to the terminal of the storage battery with the adapter post being in surface contact with the terminal of the storage battery to provide a thermal conductivity path between the adapter post and the storage battery terminal; means for removably electrically connecting the battery cable to the elongated adapter post; means in surface contact with the outer surface of the elongated adapter post for applying heat to the adapter post, with the heat applying means having a shape and size; and a groove formed in the outer surface of the adapter post having a shape and size complementary to and for receiving the heat applying means to maximize the surface contact of the heat applying means with the adapter post to provide a relatively good thermal conductivity path between the heat applying means and the terminal of the storage battery to elevate the temperature of the terminal of the storage battery above ambient air temperature.

* * * * *